(12) United States Patent
Marega (10) Patent No.: US 12,330,488 B2
(45) Date of Patent: Jun. 17, 2025

(54) EMERGENCY RELEASE MECHANISM AND WINDOW COMPRISING SAME

(71) Applicants: Ningbo Geely Automobile Research & Development Co., Ltd., Ningbo (CN); Zhejiang Geely Holding Group Co., Ltd., Zhejiang (CN)

(72) Inventor: Luca Marega, Lilla Edet (SE)

(73) Assignees: Ningbo Geely Automobile Research & Development Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 0 days.

(21) Appl. No.: 18/523,496

(22) Filed: Nov. 29, 2023

(65) Prior Publication Data
US 2024/0100923 A1     Mar. 28, 2024

Related U.S. Application Data

(63) Continuation of application No. PCT/CN2022/099138, filed on Jun. 16, 2022.

(30) Foreign Application Priority Data

Jul. 2, 2021 (EP) ..................................... 21183574

(51) Int. Cl.
*B60J 9/02*     (2006.01)
*B60J 1/08*     (2006.01)

(52) U.S. Cl.
CPC ................ *B60J 9/02* (2013.01); *B60J 1/085* (2013.01)

(58) Field of Classification Search
CPC .......... B60J 1/085; B60J 9/02; E05B 65/1033
See application file for complete search history.

(56) References Cited

U.S. PATENT DOCUMENTS 3,396,489 A * 8/1968 Cirone ................ E05B 65/1033
                                                           49/281
3,739,527 A * 6/1973 Schubach .................. B60J 9/02
                                                           49/141

(Continued)

FOREIGN PATENT DOCUMENTS

CN          205858036 U       1/2017
EP            0013978 A1 *    8/1908

(Continued)

OTHER PUBLICATIONS

International Search Report from corresponding International Application No. PCT/CN2022/099138, mailed on Sep. 6, 2022, 2 pages.

*Primary Examiner* — Catherine A Kelly
(74) *Attorney, Agent, or Firm* — Tucker Ellis LLP (57) ABSTRACT

An emergency release mechanism for a non-openable window arranged in a frame, the release mechanism includes a handle having a first end releasably attachable to a lower end of the window, wherein the handle is arranged to be attached to the frame and to be rotated about an axis of rotation which is substantially parallel to a bottom edge of the window, wherein the point of attachment between the handle and the window is offset from the axis of rotation of the handle such that an upwards rotation of the handle causes a substantially concomitant downward and outward movement of the window in relation to the frame.

7 Claims, 9 Drawing Sheets

(56) References Cited

U.S. PATENT DOCUMENTS

| | | | | |
|---|---|---|---|---|
| 4,497,512 | A * | 2/1985 | Sherrow | E05B 65/1033 292/307 R |
| 5,169,205 | A * | 12/1992 | James | B60J 9/02 49/141 |
| 5,255,479 | A * | 10/1993 | Shepherd | E04F 19/08 49/449 |
| 6,312,043 | B1 * | 11/2001 | Blackburn | B60J 1/001 296/146.16 |
| 6,364,404 | B1 * | 4/2002 | De Paoli | B60J 10/30 296/96.13 |
| 6,688,659 | B2 * | 2/2004 | Kobrehel | E05B 65/1033 292/171 |
| 6,932,395 | B1 * | 8/2005 | du Bois | E05B 65/1033 49/141 |
| 7,578,095 | B2 * | 8/2009 | Peters | E05B 65/1033 49/141 |
| 8,322,091 | B2 * | 12/2012 | Smith | B60J 1/007 49/501 |
| 8,333,036 | B2 * | 12/2012 | Helms | E05B 77/44 49/141 |
| 8,632,120 | B2 * | 1/2014 | Antonich | F41H 5/226 296/187.07 |
| 9,097,039 | B2 * | 8/2015 | Bar | B60J 7/1642 |
| 9,551,179 | B2 * | 1/2017 | Desai | B60J 1/085 |
| 2003/0110703 | A1 * | 6/2003 | Kobrehel | E05C 5/00 49/394 |
| 2011/0289850 | A1 | 12/2011 | Helms | |
| 2020/0317322 | A1 * | 10/2020 | Kovarik | B64C 1/1492 |

FOREIGN PATENT DOCUMENTS

| | | | |
|---|---|---|---|
| FR | 572623 A | 6/1924 | |
| KR | 102047462 B1 | 11/2019 | |
| WO | WO-2012052944 A1 * | 4/2012 | ............... B60J 1/00 |

\* cited by examiner

EMERGENCY RELEASE MECHANISM AND WINDOW COMPRISING SAME

RELATED APPLICATION DATA

This application is a continuation of International Patent Application No. PCT/CN2022/099138, filed Jun. 16, 2022, which claims the benefit of European Patent Application No. 21183574.9, filed Jul. 2, 2021, the disclosures of which are incorporated herein by reference in their entireties.

TECHNICAL FIELD

The present invention relates to the field of emergency escape windows in vehicles, and more specifically to non-openable emergency windows.

BACKGROUND

During vehicle emergency situations (accident, fire, drowning), end windows are often the principle escape route for vehicle occupants since doors may be difficult or impossible to open. End windows are often manually or electrically operated to open. In case of failure (e.g. electric switches do not work under water), the occupant can break the glass to escape. This is also the case with bus windows which are designed not to be opened during normal operation. However, windows made of e.g. laminated glass, plastic or other materials required by the specific construction are more difficult to break.

KR 10-2047462 B1 relates to a window opening and closing device for emergency escape from large-sized vehicles, comprising at least one connecting ring attached to the vehicle toward the top of the upper window, a frame that meshes with a window on the vehicle and seals the interior, a control box disposed in the interior of the vehicle and outputting a signal according to an operation, and an opening/closing member fixed to the connection ring on the frame to fix the window. In the case of an emergency, the opening/closing member is arranged to release the connection with the connection ring in response to a signal of the control box to remove the window from the vehicle to allow escape.

However, this solution is adapted for large vehicles and relies on battery-powered control of an electromagnetic actuator to release the window.

SUMMARY

An objective of the present disclosure is to provide a simple and secure solution for releasing an emergency window. This objective is achieved in a first aspect by an emergency release mechanism for a non-openable window arranged in a frame, the release mechanism comprising a handle having a first end releasably attachable to a lower end of the window, wherein the handle is arranged to be attached to the frame and to be rotated about an axis of rotation which is substantially parallel to a bottom edge of the window, wherein the point of attachment between the handle and the window is offset from the axis of rotation of the handle such that an upwards rotation of the handle causes a substantially concomitant downward and outward movement of the window in relation to the frame.

The offset between the axis of rotation of the handle and the point of attachment with the window provides leverage to reduce the force required to open the window in an emergency situation, for instance if a vehicle is under water. Thereby, emergency release of the window is facilitated.

In one embodiment, the emergency release mechanism comprises a first arcuate member extending from a first end of the handle. By means of the arcuate member a simple and robust solution for achieving the offset is achieved.

In one embodiment, a distal end of the first arcuate member comprises a recess arranged to receive a protruding member of the window in a snap-fit connection. By means of the snap-fit connection, the window may be released from attachment with the handle.

In one embodiment, the handle is arranged to be attached to the frame at a proximal end of the first arcuate member. The attachment provides optimal positioning of the handle and arcuate member to create leverage for rotation.

In one embodiment, the emergency release mechanism comprises at least one additional arcuate member arranged parallel to and spaced apart from the first arcuate member, wherein a distal end of the at least one additional arcuate member comprises a recess arranged to receive a respective protruding member of the window in a snap-fit connection, wherein the first and additional arcuate members are linked together to move in concert when the handle is rotated. The additional arcuate members ensure that the whole lower end of the window is moved downwards and outwards during operation of the emergency release mechanism, and also provides for a more secure attachment of the window to the frame in a non-deployed state of the emergency release mechanism.

In one embodiment, the first and additional arcuate members are linked together by means of one or more rods passing through one or more plates. The plates ensure that the rods are held in place and rotate in concert to avoid twisting during rotation of the handle.

In a second aspect of the present disclosure, there is provided a non-openable window comprising an emergency release mechanism according to the first aspect.

In one embodiment, an upper end of the window is arranged to be mounted to the frame along an upper edge by means of frangible fasteners arranged to be broken by downwards movement of the window. The frangible fasteners allow for quick and safe release of the window during operation of the emergency release mechanism, whilst securing the window to the frame during normal operation.

In a third aspect of the present disclosure, there is provided a vehicle comprising a non-openable window according to the second aspect.

Further features and advantages of the present disclosure will become apparent when studying the appended claims and the following description. The person skilled in the art realizes that different features of the present disclosure may be combined to create embodiments other than those described hereinabove, without departing from the scope of the present disclosure.

BRIEF DESCRIPTION OF THE DRAWINGS

With reference to the appended drawings, below follows a more detailed description of example embodiments of the invention, wherein.

DETAILED DESCRIPTION OF EXAMPLE EMBODIMENTS

In the following, a detailed description of an emergency release mechanism for a non-openable window according to the present disclosure is presented. In the drawing figures, like reference numerals designate identical or corresponding elements throughout the several figures. It will be appreciated that these figures are for illustration only and do not in any way restrict the scope of the present disclosure.

Figure 1:
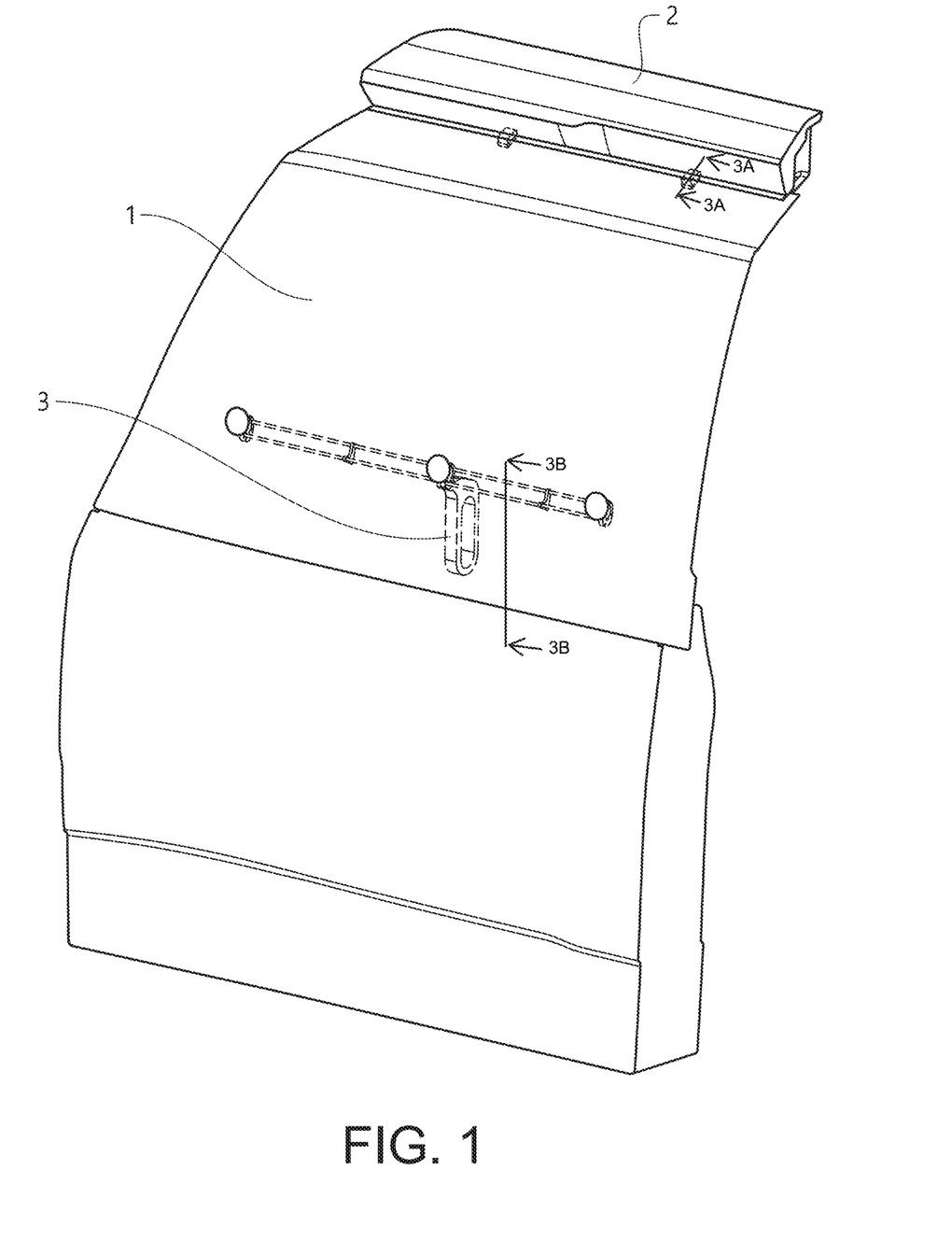
FIG. 1 is a perspective external view of a vehicle door.

With reference to FIG. 1, there is shown an external view of a cut-away portion of a vehicle door comprising a window 1 mounted in a frame 2 of the door. An emergency release mechanism for the window 1 is shown in hatched lines. The window 1 may have a curved, non-planar shape dictated by the overall design of the vehicle and the frame 2. As such, the shape of the window 1 and/or other criteria including safety, manufacturing, performance etc. dictate that the window 1 is non-openable during normal operation of the vehicle.

Figure 2:
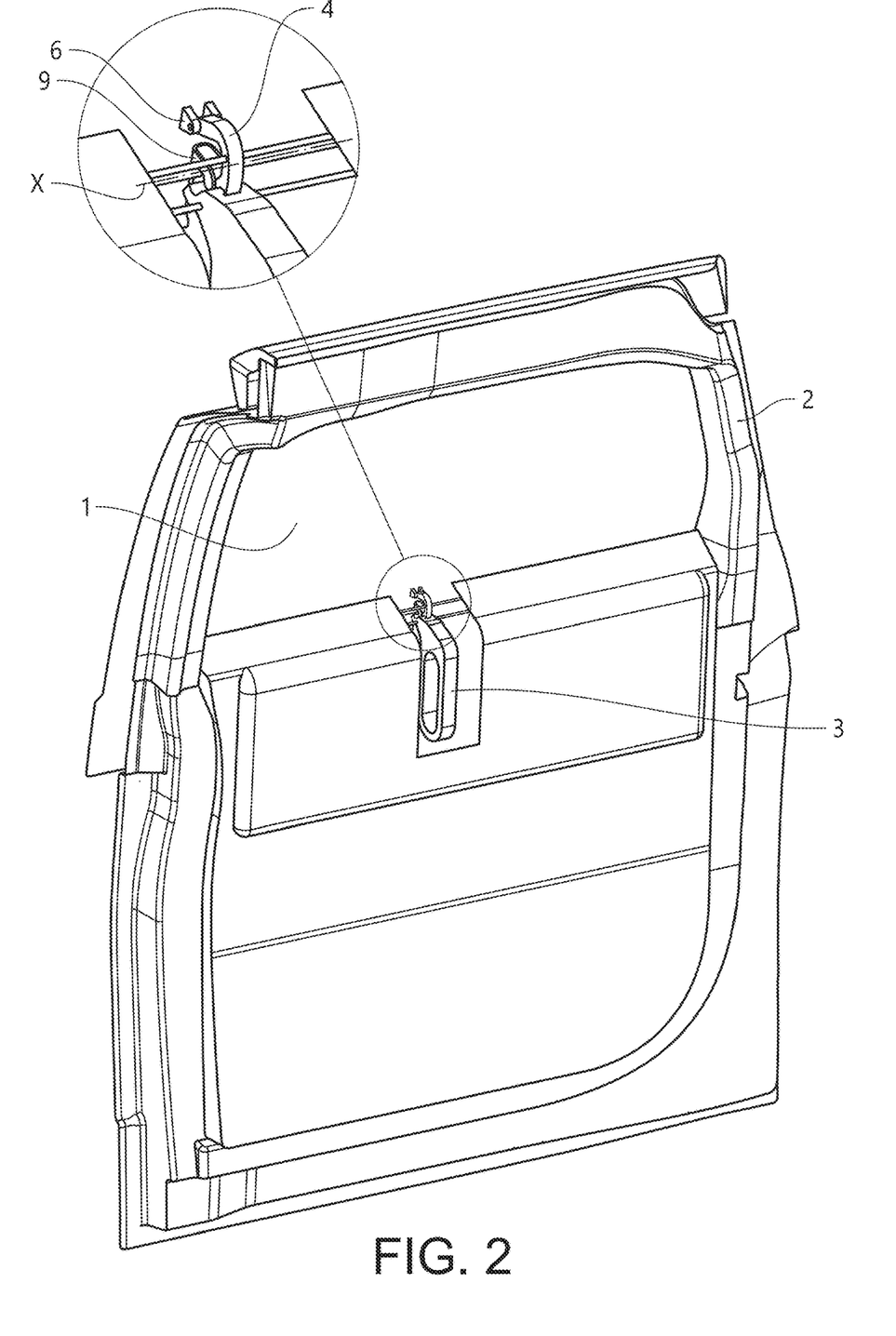
FIG. 2 is a perspective internal view of a vehicle door showing an emergency release mechanism according to one embodiment of the present disclosure.

Referring now to FIG. 2, the vehicle door is shown in an internal view. Near the lower end of the window 1, an emergency release mechanism including a handle 3 is attached to the window 1 and to the frame 2. The handle 3 is attached to the frame 2 to be rotated about an axis of rotation X which is substantially parallel to the lower end of the window 1, extending substantially along a horizontal longitudinal extension of the vehicle. In this case, substantially parallel should be interpreted as lying within a range of ±10°.

In a close-up view in FIG. 2, the attachment is shown more in detail. The handle 3 comprises an arcuate member 4 extending from a first end of the handle 3 towards the window 1. The distal end of the arcuate member 4 is releasably attached to the window 1 via a protruding member 6. The protruding member 6 may be a rod or pin fastened to the internal pane of the window 1 and oriented parallel to the axis of rotation X of the handle 3. The handle 3 is attached to the frame 2 in a rotatable manner to allow rotation about the axis of rotation X. To this end, the frame 2 comprises a bracket 9 arranged to receive a proximal end of the arcuate member 4. As will be further noted below, the point of attachment between the handle 3 and the window 1 is offset from the axis of rotation X, both in a vertical and a horizontal direction.

Figure 3A:
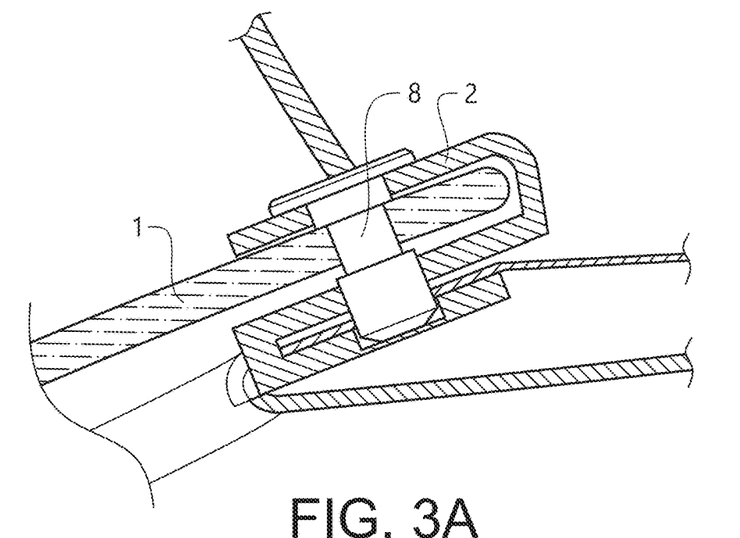
FIGS. 3A, 4A, 5A, and 6A, and 3B, 4B, 5B, and 6B are cross-sectional views of upper and lower ends of a vehicle window, respectively, during different stages of deployment of the emergency release mechanism.
Figure 3B:
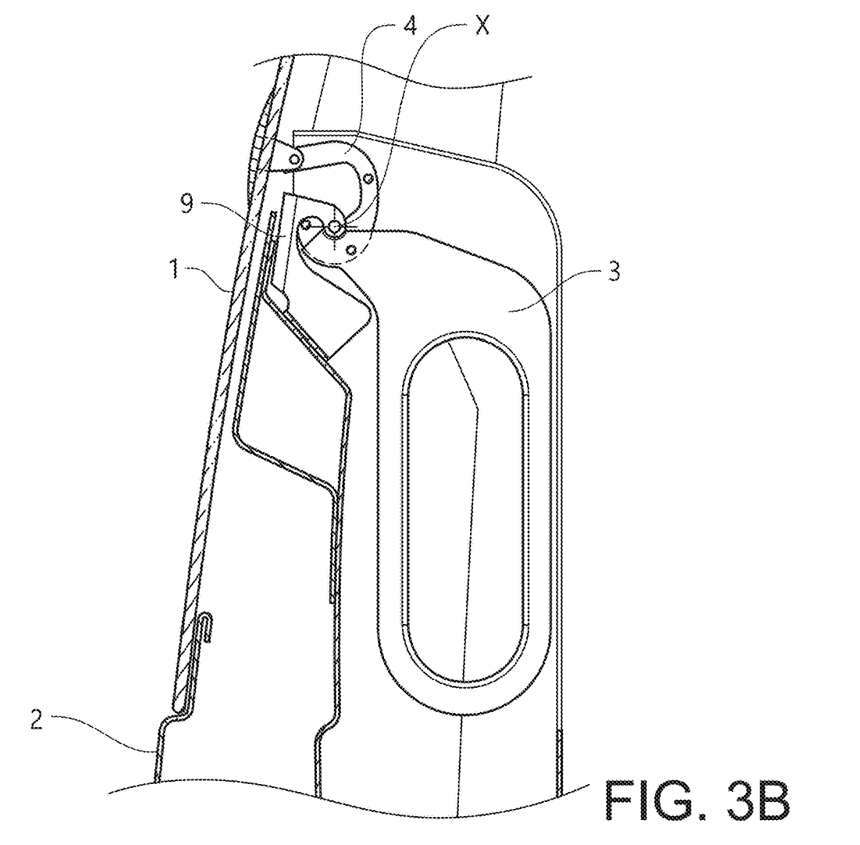

Referring now to FIGS. 3A and 3B, the upper and lower ends of the window 1, respectively, are shown mounted in the frame 2 in a non-deployed state of the emergency release mechanism, wherein the handle 3 is in a lowermost position oriented downwards and accommodated within the panel of the vehicle door. In this position, the lower end of the window 1 is held tightly against the frame 2 by the handle 3 as shown in FIG. 3B. A sealing profile (not shown) may be arranged along the circumference between the window 1 and the frame 2 to provide a water-tight seal to prevent water leakage inside the vehicle. The upper end of the window 1 is received in a recess formed by the frame 2 and held in place by one or more fasteners 8. The fastener 8 may be a clip or pin attached to the frame 2 and extending through an opening in the window 1.

Figure 4A:
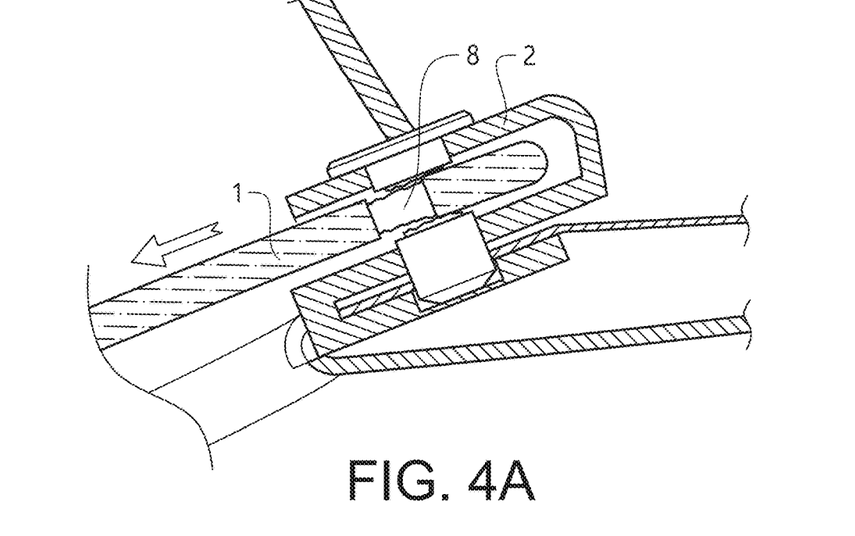
Figure 4B:
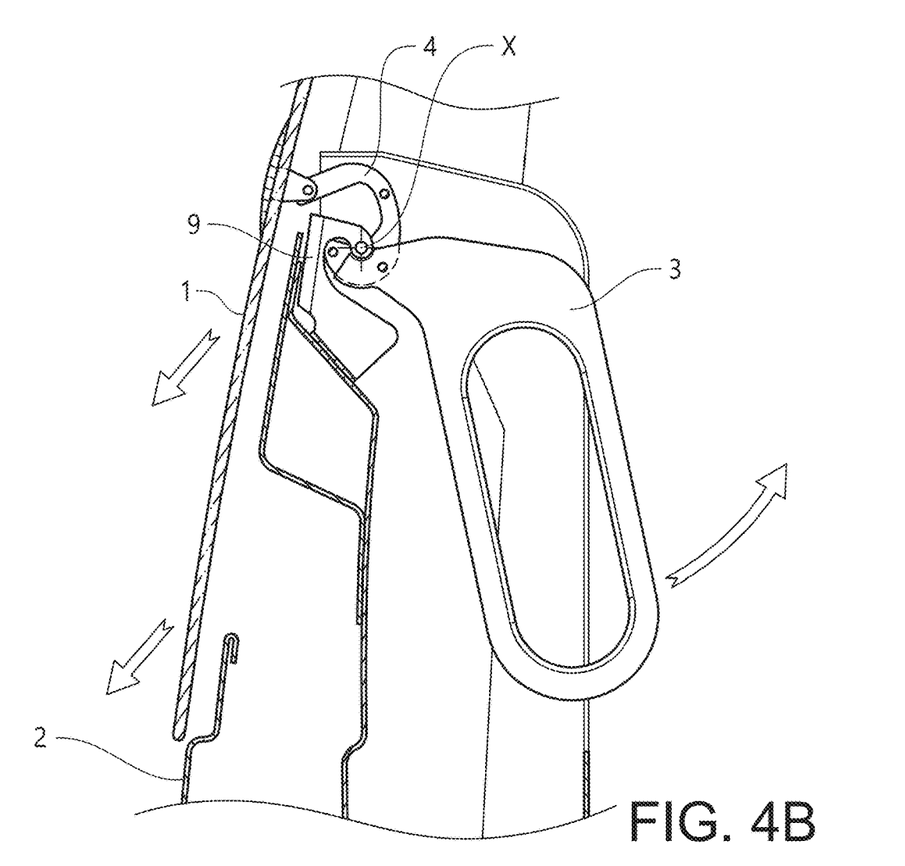

Referring now to FIGS. 4A and 4B, illustrating the upper and lower ends of the window 1, respectively, in an initial state of deployment of the emergency release mechanism, wherein the handle 3 has been rotated upward in a counter-clockwise direction as indicated by the arrow. The upward rotation of the handle causes an outward and downward rotation of the arcuate member 4 which transfers the downward and outward movement to the window 1 as shown by the arrows in FIG. 4A, due to the vertical and horizontal offset between the point of attachment between the window 1 and the handle 3 near the distal end of the arcuate member 4. At the same time, the upper end of the window 1 is pulled out of the recess in the frame 2, breaking the fastener 8 in the process as indicated by the arrow in FIG. 4A. To this end, the fastener 8 is frangible and configured to break when a predetermined amount of force is applied through rotation of the handle 3.

Figure 5A:
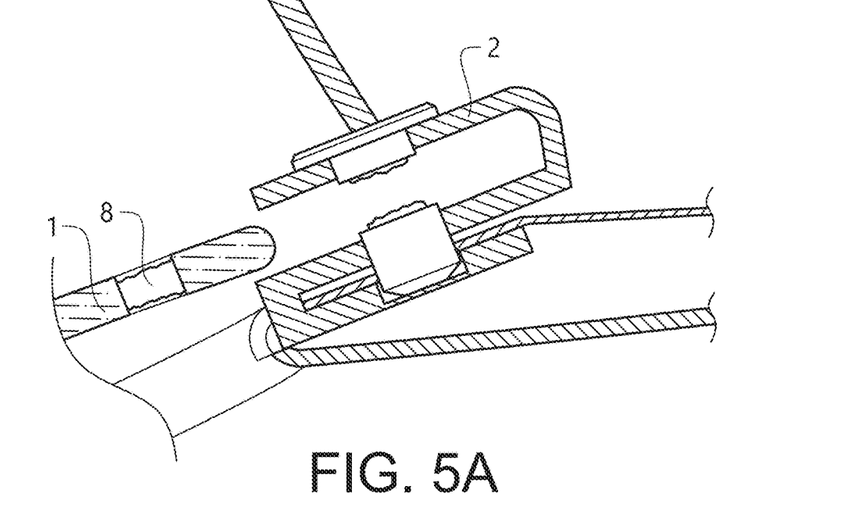
Figure 5B:
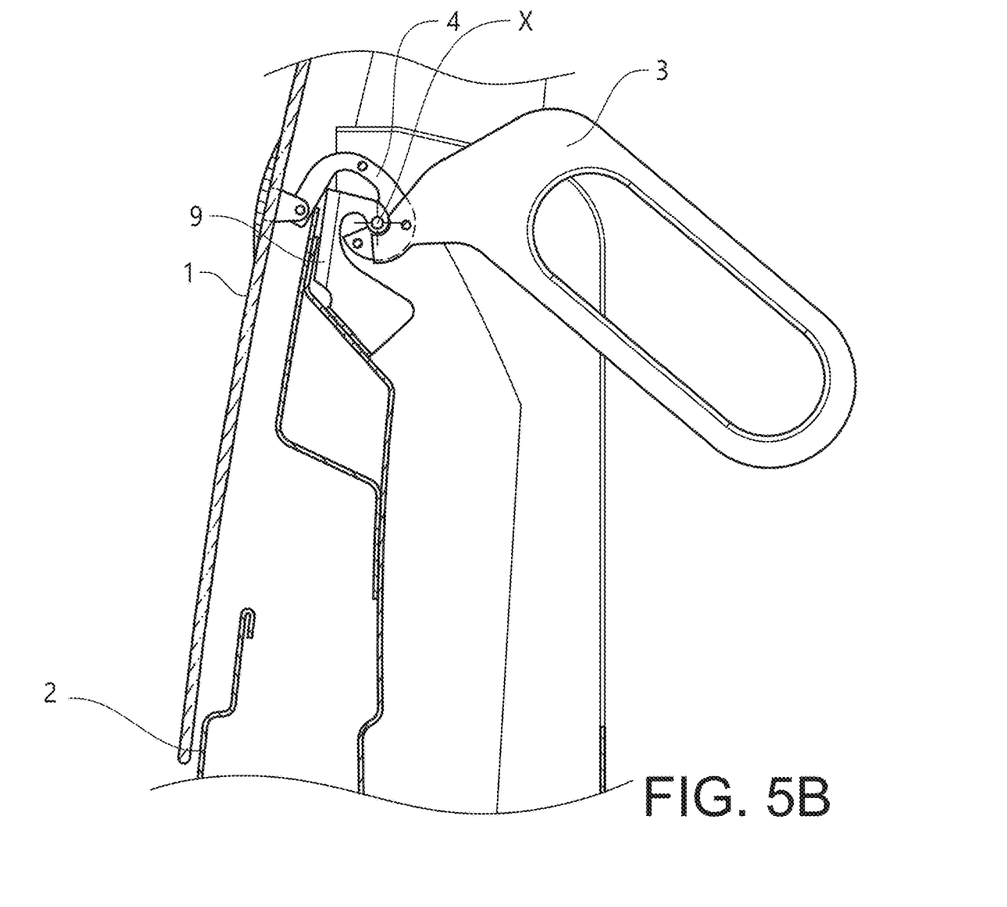

Referring now to FIGS. 5A and 5B, illustrating the upper and lower ends of the window 1, respectively, in a final state of deployment of the emergency release mechanism, wherein the handle 3 has been rotated to its uppermost position. Likewise, the window 1 has moved downwards and outwards to the maximum extent allowed by the emergency release mechanism. As shown in FIG. 5A, the upper end of the window 1 is fully pulled out of the recess in the frame 2.

Figure 6A:
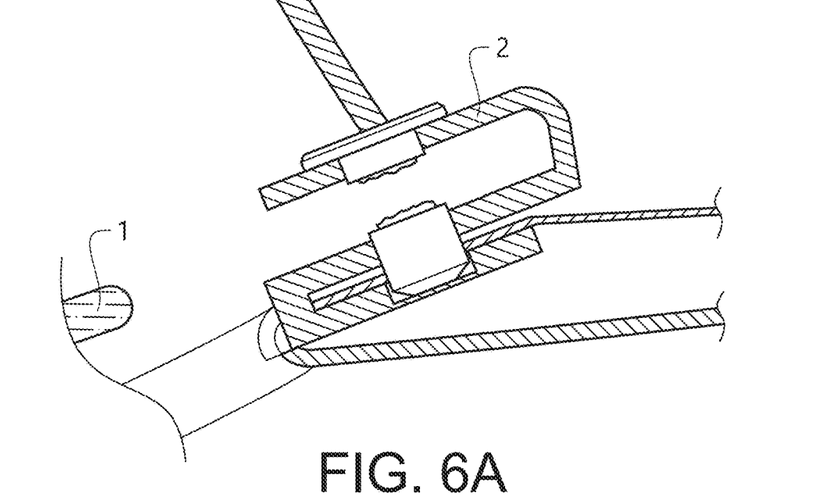
Figure 6B:
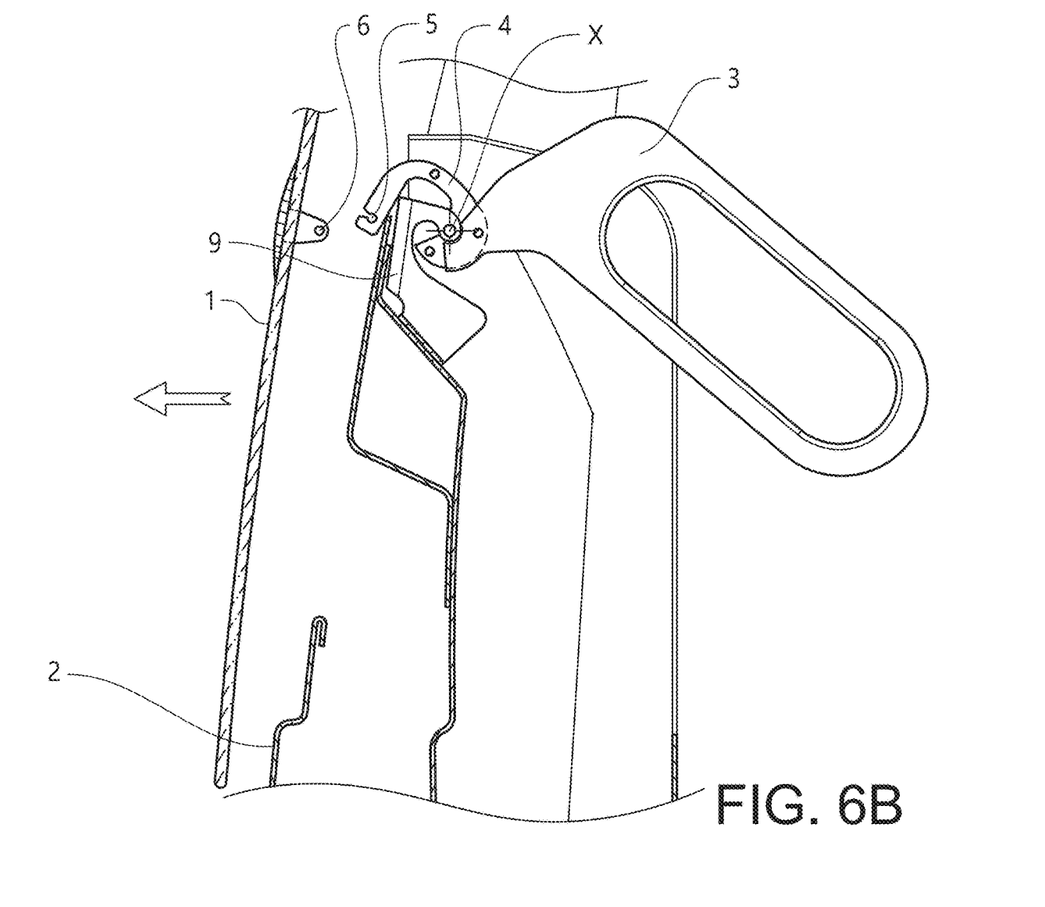
Figure 6C:
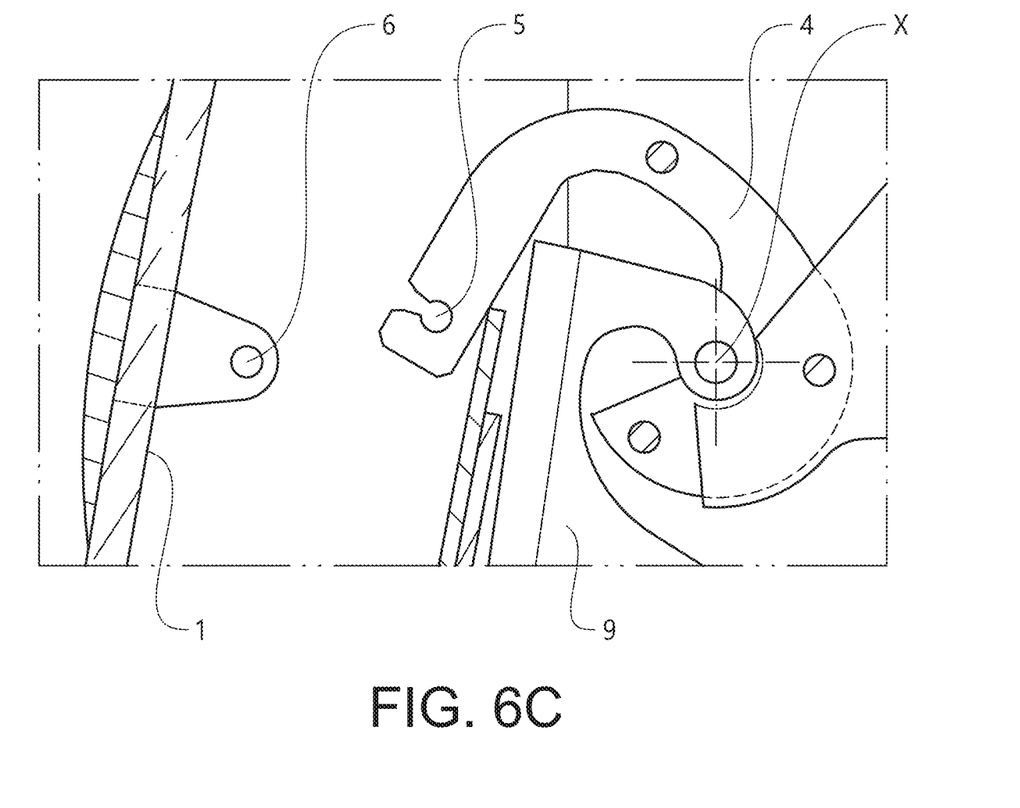
FIG. 6C is a close-up view of the emergency release mechanism shown in FIG. 6B.

Referring now to FIGS. 6A and 6B, illustrating the upper and lower ends of the window 1, respectively, after being released from the frame 2 and the emergency release mechanism. With the handle 3 in the uppermost position, a vehicle passenger may push the window 1 outwardly until the attachment between the protruding member 6 of the window 1 is released from the arcuate member 4. To this end, a recess 5 is formed near the distal end of the arcuate member 4 to receive the protruding member 6 in a snap-fit connection, as illustrated in FIG. 6C. The arcuate member 4 may be manufactured in a resilient material which allows for sufficient deformation of the snap to enable the protruding member 6 to pop out of the recess 5. Alternatively, the arcuate member 4 may be configured to break when a predetermined amount of force is applied to release the window 1 from the handle 3. The recess 5 is circular in shape to enable rotation in relation to the protruding member 6 when the handle 3 is rotated.

Figure 7:
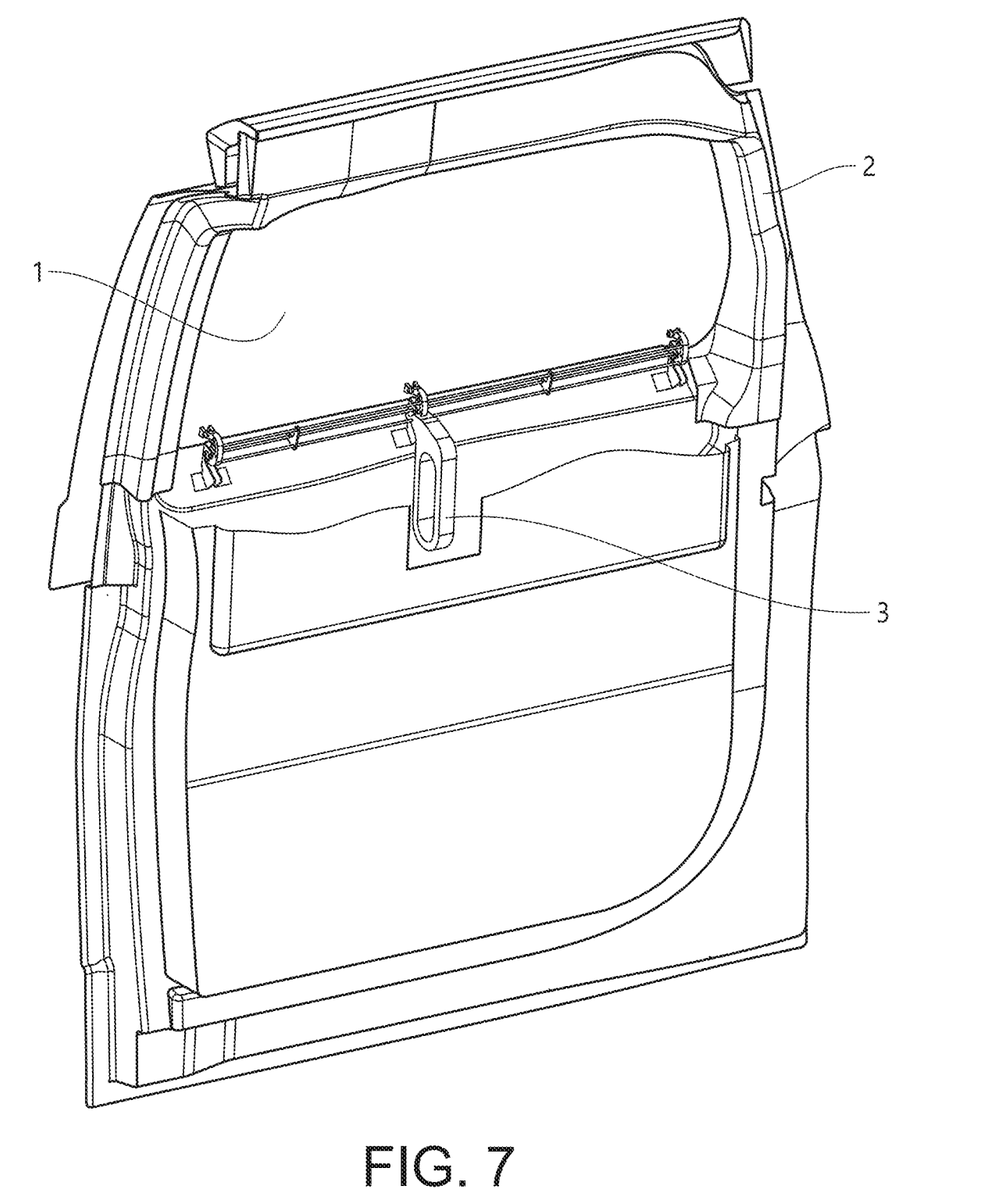
FIG. 7 is a perspective internal view of a vehicle door showing an emergency release mechanism according to another embodiment of the present disclosure.
Figure 8:
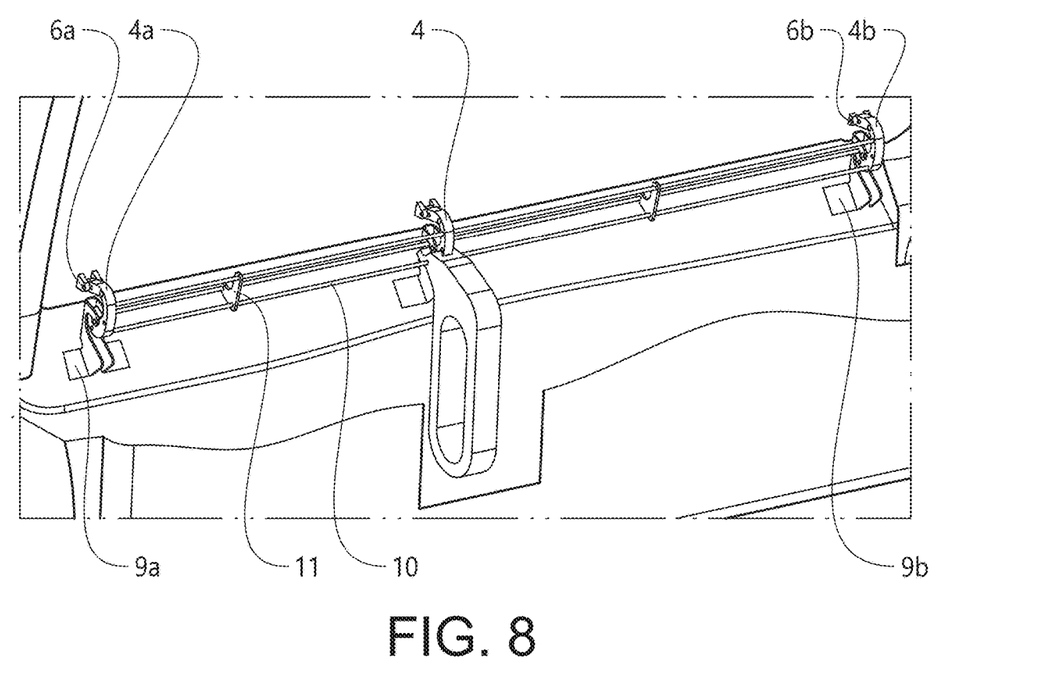
FIG. 8 is a close-up view of the emergency release mechanism shown in FIG. 7.

Referring now to FIGS. 7 and 8, there is shown an interior view of a vehicle door with an emergency release mechanism according to another embodiment of the present disclosure. In this embodiment, the emergency release mechanism comprises additional arcuate members 4a and 4b arranged to co-rotate with the first arcuate member 4 when the handle 3 is rotated. As may be seen in FIG. 8, the additional arcuate members 4a and 4b are substantially identical to the first arcuate member 4, each arranged at a distance from the first arcuate member 4 and mounted in respective brackets 9a and 9b on the frame 2 to rotate about the axis of rotation X. The additional arcuate members 4a and 4b are releasably attached to the window 1 by means of protruding members 6a and 6b. The arcuate members 4, 4a and 4b are linked together by one or more rods 10 passing through plates 11 to avoid twisting of the rods 10 during rotation of the handle 3. The additional arcuate members 4a and 4b ensure that the whole lower end of the window 1 is moved downwards and outwards during operation of the emergency release mechanism, and also provides for a more secure attachment of the window 1 to the frame 2 in a non-deployed state of the emergency release mechanism.

Although the invention has been illustrated and described in detail in the drawings and foregoing description, such illustration and description are to be considered illustrative or exemplary and the invention is not limited to the disclosed embodiments. For example, the window and emergency release mechanism may be arranged in a building or other structure instead of a vehicle.

Although the invention has been illustrated and described in detail in the drawings and foregoing description, such illustration and description are to be considered illustrative or exemplary and the invention is not limited to the disclosed embodiments.

What is claimed is:

1. A non-openable window comprising an emergency release mechanism, wherein the non-openable window is arranged in a frame, the release mechanism comprising a handle having a first end releasably attachable to a lower end of the window, wherein the handle is attached to the frame and is rotatable about an axis of rotation which is substantially parallel to a bottom edge of the window,
wherein a point of attachment between the handle and the window is offset from the axis of rotation of the handle such that an upwards rotation of the handle causes a substantially concomitant downward and outward movement of the window in relation to the frame, and
wherein an upper end of the window is arranged to be mounted to the frame along an upper edge by frangible fasteners that break by downwards movement of the window, and wherein the frangible fasteners break when a predetermined amount of force is applied through rotation of the handle.

2. The non-openable window according to claim 1, comprising a first arcuate member extending from a first end of the handle.

3. The non-openable window according to claim 2, wherein a distal end of the first arcuate member comprises a recess arranged to receive a protruding member of the window in a snap-fit connection.

4. The non-openable window according to claim 2, wherein the handle is arranged to be attached to the frame at a proximal end of the first arcuate member.

5. The non-openable window according to claim 1, comprising at least one additional arcuate member arranged parallel to and spaced apart from the first arcuate member, wherein a distal end of the at least one additional arcuate member comprises a recess arranged to receive a respective protruding member of the window in a snap-fit connection, wherein the first and the at least one additional arcuate member are linked together to move in concert when the handle is rotated.

6. The non-openable window according to claim 5, wherein the first and the at least one additional arcuate member are linked together by means of one or more rods passing through one or more plates.

7. A vehicle comprising the non-openable window according to claim 1.

* * * * *